(12) United States Patent
Proctor (10) Patent No.: US 11,593,668 B2
(45) Date of Patent: Feb. 28, 2023

(54) SYSTEM AND METHOD FOR VARYING VERBOSITY OF RESPONSE IN A GROUP COMMUNICATION USING ARTIFICIAL INTELLIGENCE

(71) Applicant: MOTOROLA SOLUTIONS, INC, Chicago, IL (US)

(72) Inventor: Lee M Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1013 days.

(21) Appl. No.: 15/390,816

(22) Filed: Dec. 27, 2016

(65) Prior Publication Data

US 2018/0181656 A1 Jun. 28, 2018

(51) Int. Cl.

| | |
|---|---|
| *G06N 5/02* | (2006.01) |
| *H04W 4/10* | (2009.01) |
| *H04W 24/02* | (2009.01) |
| *G10L 15/22* | (2006.01) |
| *G10L 15/30* | (2013.01) |
| *G10L 15/18* | (2013.01) |

(Continued)

(52) U.S. Cl.
CPC ......... *G06N 5/022* (2013.01); *G06F 16/3329* (2019.01); *G06F 16/345* (2019.01); *G10L 15/18* (2013.01); *G10L 15/22* (2013.01); *G10L 15/30* (2013.01); *H04L 1/0006* (2013.01); *H04L 1/0014* (2013.01); *H04W 4/10* (2013.01); *H04W 4/90* (2018.02); *H04W 8/04* (2013.01); *H04W 24/02* (2013.01); *H04W 76/45* (2018.02); *H04W 76/50* (2018.02); *G10L 2015/223* (2013.01)

(58) Field of Classification Search
CPC .............. G06F 16/3329; G06F 16/345; G06F 17/30864; G06N 5/022; G10L 15/22; G10L 15/30; G10L 15/18
USPC .......... 707/706; 704/231, 251, 275, E15.001
See application file for complete search history.

(56) References Cited

U.S. PATENT DOCUMENTS

| | | |
|---|---|---|
| 5,012,409 A | 4/1991 | Fletcher et al. |
| 7,844,460 B2 | 11/2010 | Charlier et al. |

(Continued)

FOREIGN PATENT DOCUMENTS

| | | |
|---|---|---|
| WO | 2011151502 A1 | 12/2011 |
| WO | 2013184048 A1 | 12/2013 |

(Continued)

OTHER PUBLICATIONS

The International Search Report and the Written Opinion, corresponding patent application No. PCT/US2017/006093 filed Dec. 13, 2017, dated May 23, 2018 all pages.

(Continued)

*Primary Examiner* — Tony Mahmoudi
*Assistant Examiner* — Kamal K Dewan (57) ABSTRACT

Efficient use of channel bandwidth response, response timing, along with the ability to acquire the most accurate and up to date response are provided for management of virtual assistant search queries within a communication system (100). Improved management is obtained using an artificial intelligence (AI) server (104) controlling response activity to a query communication device (102) by incorporating one or more of: adjusting verbosity of responses (158), redirecting queries from the AI server to alternate resources (412), and/or prioritizing of a response (506) based on wait time.

21 Claims, 5 Drawing Sheets

(51) Int. Cl.

| | | |
|---|---|---|
| H04W 76/50 | (2018.01) | |
| G06F 16/332 | (2019.01) | |
| H04L 1/00 | (2006.01) | |
| H04W 4/90 | (2018.01) | |
| G06F 16/34 | (2019.01) | |
| H04W 76/45 | (2018.01) | |
| H04W 8/04 | (2009.01) | |
| G06N 5/022 | (2023.01) | |

(56) References Cited

U.S. PATENT DOCUMENTS

| | | | |
|---|---|---|---|
| 8,166,173 B2 | 4/2012 | Low et al. | |
| 8,370,155 B2 | 2/2013 | Byrd et al. | |
| 8,700,008 B2 | 4/2014 | Reddy et al. | |
| 8,837,906 B2 | 9/2014 | May et al. | |
| 9,288,035 B2 | 3/2016 | Johnson et al. | |
| 9,294,340 B1* | 3/2016 | Logue | G06F 16/258 |
| 2002/0037735 A1 | 3/2002 | Maggenti et al. | |
| 2002/0058523 A1* | 5/2002 | Maggenti | H04W 76/45 |
| | | | 455/517 |
| 2002/0102999 A1 | 8/2002 | Maggenti et al. | |
| 2003/0017836 A1 | 1/2003 | Vishwanathan et al. | |
| 2003/0153343 A1 | 8/2003 | Crockett et al. | |
| 2003/0154249 A1 | 8/2003 | Crockett et al. | |
| 2003/0212541 A1* | 11/2003 | Kinder | G06F 40/20 |
| | | | 704/4 |
| 2003/0231639 A1 | 12/2003 | Mikkola | |
| 2005/0197146 A1 | 9/2005 | Rao et al. | |
| 2005/0202836 A1 | 9/2005 | Schaedler et al. | |
| 2005/0260988 A1 | 11/2005 | Kauppinen | |
| 2006/0161394 A1 | 7/2006 | Dulberg et al. | |
| 2007/0064609 A1* | 3/2007 | Igarashi | H04L 47/10 |
| | | | 370/230 |
| 2007/0065357 A1 | 3/2007 | Chien | |
| 2007/0103294 A1 | 5/2007 | Bonecutter et al. | |
| 2007/0150286 A1 | 6/2007 | Miller et al. | |
| 2007/0155346 A1 | 7/2007 | Mijatovic et al. | |
| 2008/0112545 A1 | 5/2008 | Li et al. | |
| 2008/0125059 A1 | 5/2008 | Schultz et al. | |
| 2008/0126095 A1 | 5/2008 | Sideman | |
| 2008/0200162 A1 | 8/2008 | Chowdhury et al. | |
| 2008/0207167 A1 | 8/2008 | Bugenhagen | |
| 2008/0233944 A1 | 9/2008 | Tu | |
| 2008/0248792 A1 | 10/2008 | Gundu | |
| 2009/0098898 A1 | 4/2009 | Patterson | |
| 2009/0125584 A1 | 5/2009 | Agrawala et al. | |
| 2009/0325621 A1 | 12/2009 | Rossotto et al. | |
| 2010/0087142 A1 | 4/2010 | Panpaliya et al. | |
| 2010/0087199 A1 | 4/2010 | Chowdhary et al. | |
| 2010/0286490 A1 | 11/2010 | Koverzin | |
| 2011/0044226 A1 | 2/2011 | Song et al. | |
| 2011/0143651 A1 | 6/2011 | Marocchi et al. | |
| 2011/0161399 A1 | 6/2011 | Agulnik et al. | |
| 2011/0199915 A1 | 8/2011 | Santhanam et al. | |
| 2012/0036145 A1* | 2/2012 | Tunstall-Pedoe | |
| | | | G06F 16/24534 |
| | | | 707/760 |
| 2012/0134352 A1 | 5/2012 | Vu | |
| 2012/0163309 A1* | 6/2012 | Ma | H04B 7/2606 |
| | | | 370/329 |
| 2012/0192080 A1 | 7/2012 | Lloyd | |
| 2012/0244812 A1 | 9/2012 | Rosener | |
| 2013/0021965 A1 | 1/2013 | Chu et al. | |
| 2013/0066551 A1 | 3/2013 | Bednar et al. | |
| 2013/0109425 A1 | 5/2013 | Kerger et al. | |
| 2013/0128060 A1* | 5/2013 | Rhoads | G06F 3/023 |
| | | | 348/207.1 |
| 2013/0157708 A1 | 6/2013 | Economy et al. | |
| 2014/0019873 A1 | 1/2014 | Gupta et al. | |
| 2014/0046951 A1* | 2/2014 | Redfern | G06F 16/3338 |
| | | | 707/741 |
| 2014/0187280 A1 | 7/2014 | Bekiares et al. | |
| 2014/0358549 A1 | 12/2014 | O'Connor et al. | |
| 2014/0358964 A1 | 12/2014 | Woods et al. | |
| 2014/0370895 A1 | 12/2014 | Pandey et al. | |
| 2015/0039691 A1* | 2/2015 | Sharma | H04L 65/1016 |
| | | | 709/204 |
| 2015/0072716 A1 | 3/2015 | Klein | |
| 2015/0113105 A1 | 4/2015 | Ackley et al. | |
| 2015/0142704 A1* | 5/2015 | London | G06F 16/90332 |
| | | | 706/11 |
| 2015/0169287 A1 | 6/2015 | Ghandour | |
| 2015/0173106 A1 | 6/2015 | Newberg et al. | |
| 2015/0236843 A1 | 8/2015 | Johnson et al. | |
| 2015/0244868 A1* | 8/2015 | Cartwright | H04M 3/569 |
| | | | 370/260 |
| 2015/0279348 A1 | 10/2015 | Cao et al. | |
| 2015/0319585 A1 | 11/2015 | Raj | |
| 2016/0044064 A1 | 2/2016 | Pison et al. | |
| 2016/0063893 A1 | 3/2016 | Kanuganti et al. | |
| 2016/0135229 A1 | 5/2016 | Swierczynski et al. | |
| 2016/0135230 A1 | 5/2016 | Swierczynski et al. | |
| 2016/0170710 A1 | 6/2016 | Kim et al. | |
| 2016/0173644 A1 | 6/2016 | Goel et al. | |
| 2016/0179787 A1 | 6/2016 | Deleeuw | |
| 2016/0205517 A1 | 7/2016 | Luo et al. | |
| 2016/0337291 A1 | 11/2016 | Park et al. | |
| 2016/0352567 A1 | 12/2016 | Robbins | |
| 2017/0004324 A1 | 1/2017 | Seo et al. | |
| 2017/0026318 A1 | 1/2017 | Daniel et al. | |
| 2017/0140068 A1 | 5/2017 | Oh et al. | |
| 2017/0147919 A1 | 5/2017 | Lee et al. | |
| 2017/0178626 A1* | 6/2017 | Gruber | G10L 15/22 |
| 2017/0193084 A1 | 7/2017 | Ghafourifar et al. | |
| 2017/0289341 A1* | 10/2017 | Rodriguez | G06F 3/04842 |
| 2017/0311256 A1 | 10/2017 | Patel et al. | |
| 2018/0032997 A1* | 2/2018 | Gordon | G06Q 20/3224 |
| 2018/0052842 A1* | 2/2018 | Hewavitharana | G06F 16/951 |
| 2018/0108343 A1* | 4/2018 | Stevans | G10L 13/043 |
| 2018/0317058 A1* | 11/2018 | Mazzarella | H04M 3/56 |

FOREIGN PATENT DOCUMENTS

| | | |
|---|---|---|
| WO | 2015030796 A1 | 3/2015 |
| WO | 2015195734 A1 | 12/2015 |

OTHER PUBLICATIONS

Qing Li et al.: "CA-P2P: Context-Aware Proximity-Based Peer-to-Peer Wireless Communications", IEEE Communications Magazine, Jun. 2014, all pages.

Lewis, Grace et al.: "A Reference Architecture for Group-Context-Aware Mobile Applications", Chapter Mobile Computing, Applications, and Services, vol. 110 of the series Lecture Notes of the Institute for Computer Sciences, Social Informatics and Telecommunications Engineering pp. 44-63.

Wave 5000 Data Sheet, Motorola Solutions, Inc., 2016, all pages.

Anonymous: "Voice as a Platform-Roger", Youtube,Sep. 1, 2016 (Sep. 1, 2016), pp. 1-4, XP055450989, Retrieved from the Internet: URL:https://www.youtube.com/watch?v=bclvDW7ZZNM [retrieved on Feb. 14, 2018].

Jeff Barr: "New—Alexa Skills Kit, Alexa Voice Service, Alexa Fund", Jun. 25, 2015 (Jun. 25, 2015), pp. 1-3, XP055450914, Retrieved from the Internet: URL:https://aws.amazon.com/blogs/aws/new-a lexa-skills-kit-alexa-voice-service-alexa-fund/ [retrieved on Feb. 14, 2018] p. 1.

Julian Chokkattu: "You can now use Alexa on your phone through an app called Roger", digitaltrends.com, Dec. 5, 2016 (Dec. 5, 2016), pp. 1-2, XP055450870, Retrieved from the Internet: URL:https://www.digitaltrends.com/mobile/r oger-adds-alexa/ [retrieved on Feb. 13, 2018].

Julian Chokkattu: "Roger 2.0 turns your phone into a walkie-talkie with push-to-talk TalkHeads", digitaltrends.com, Sep. 1, 2016 (Sep. 1, 2016), pp. 1-3, XP055450868, Retrieved from the Internet: URL:https://www.digitaltrends.com/mobile/r oger-version-2-talkheads/ [retrieved on Feb. 13, 2018] the whole document.

Anonymous: "Public Safety Virtual Assistants for FirstNet", Firstnet.gov, Feb. 22, 2016 (Feb. 22, 2016), pp. 1-5, XP055450872, Retrieved (56) References Cited

OTHER PUBLICATIONS from the Internet: URL:https://www.firstnet.gov/newsroom/blog /public-safety-virtual-assistants-firstnet [retrieved on Feb. 13, 2018] pp. 1-3.
The International Search Report and the Written Opinion corresponding patent application No. PCT/US2017/06111 filed Dec. 13, 2017, dated Feb. 23, 2018, all pages.
Wild Jet Al: "Push-to-talk: a first step to a unified instant communication future", Emerging Wireless Multimedia: Services and Technologies, Wiley, New York, NY, US, Jul. 1, 2005 (Jul. 1, 2005), pp. 367-394, XP002367504, DOI: 10.1002/0470021519.CH13 p. 370-p. 372 p. 375 p. 381-p. 382.
The International Search Report and the Written Opinion corresponding patent application No. pct/us2017/066104 filed Dec. 13, 2017, dated May 3, 2018, all pages.
Wild J et al: "Push-to-talk: a first step to a unified instant communication future", Emerging Wireless Multimedia: Services and Technologies, Wiley, New York, NY, US Jul. 1, 2005, all pages.
The International Search Report and the Written Opinion, corresponding patent application No. PCT/US2017/066104 filed Dec. 13, 2017, all pages.

\* cited by examiner

SYSTEM AND METHOD FOR VARYING VERBOSITY OF RESPONSE IN A GROUP COMMUNICATION USING ARTIFICIAL INTELLIGENCE

RELATED APPLICATIONS

This application is related to U.S. application Ser. No. 15/390,797 and U.S. application Ser. No. 15/390,830 commonly assigned to and owned by Motorola Solutions, Inc.

FIELD OF THE INVENTION

The present invention relates generally to radio communication systems and more particularly to the application of artificial intelligence in radio communication systems.

BACKGROUND

Being able to get the best search out of every search query through a virtual assistant without impeding communications is important, not only to the user of the query device but also within the management of the overall communication system. A server utilized in virtual assistant queries and responses may be managing many queries sent from different devices at one time. Efficient use of channel bandwidth, response timing, along with the ability to acquire the most accurate and up to date response are all important factors of consideration in the management of virtual assistant search queries within a communication system offering such searching capability. Systems that have had limited opportunity to take advantage of virtual assistant searching capabilities, such as public safety communication systems, would be able to consider incorporating such search capabilities if improvements were made in the ability to manage the system. Such improvements would benefit not only public safety applications, but any communication system incorporating virtual assistant query capability.

Accordingly, there is a need for improving the management of virtual searching capabilities within a communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an artificial intelligence server providing natural language processing and query response operation incorporated into a communication system. The AI server of the various embodiments responds to queries from one or more radios within the communication system. The various methods utilized by the AI server within the various embodiments serve to minimize disruption in communication, maximize channel usage, and prioritize responses. The AI server operating in accordance with one or more of these methods is beneficial to all types of communication systems, including but not limited to broadband systems, and even extending into broadband half-duplex enabled systems, and narrowband half-duplex systems, to name a few. The benefits of extending the AI server capabilities into half-duplex communication systems, allows public safety radio communication system to advantageously provide search query capability, via virtual searching, not readily available to public safety radio users in the past.

Figure 1A:
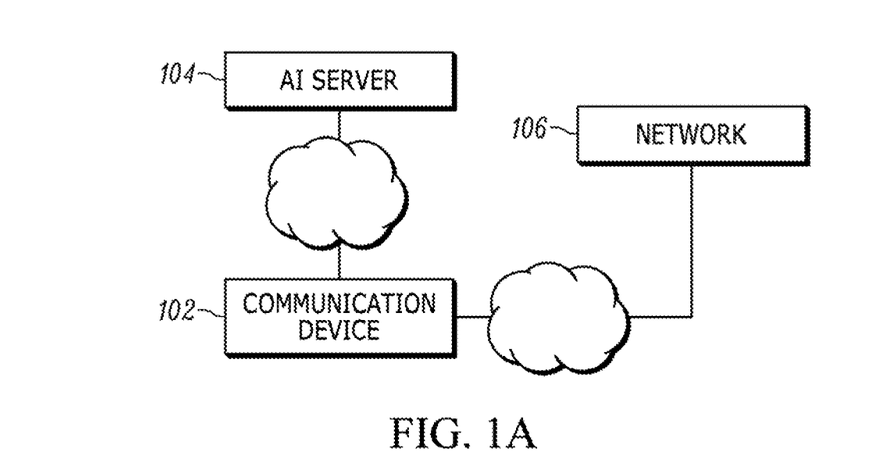
FIG. 1A is a communication system block diagram formed and operating in accordance with some embodiments.

FIG. 1A shows a communication system 100 comprising a wireless communication device 102, an artificial intelligence (AI) server 104, operating within a communications network 106 in accordance with some embodiments. The AI server 104 comprises language processing and response capability to operate as a virtual assistant. Virtual assistants, such as Siri provided by Apple, Inc.® and Google Now provided by Google, Inc.®, are software applications that understand natural language and complete electronic tasks in response to user inputs. The communication device 102 may be any broadband or narrowband device having a microprocessor, transceiver, and audio circuitry, such as a radio, a cell phone or the like, for receiving a verbal query user input for transmission to the AI server 104.

The AI server 104 controls query and response activity in an optimized manner between the AI server 104 and the communication device 102 thereby maintaining an efficient use of channel bandwidth. In accordance with some embodiments, the AI server 104 provides prioritization of responses sent from the AI server 104 to the query, based on verbosity of the response and channel availability within the communication system 100. The verbose response may be adjusted so as not to exceed available channel bandwidth in a variety of ways. For example, the AI server may manage a verbose response by prioritizing content within the verbose response, and then segmenting the prioritized content into shorter prioritized responses, thereby efficiently filling up available channel bandwidth without exceeding the available channel bandwidth. Content prioritization may further be based on, for example, the length and/or complexity of the verbose response. Thus, different priority factors can be used in segmenting a response.

In accordance with some embodiments, AI server 104 may also adjust verbosity of response by forming condensed responses. Adjusting verbosity through the use of a condensed response can be accomplished in many ways, for example by using acronyms instead of complete words, using alternative shorter words, removing extraneous words, and using predetermined codenames, to name a few. The AI server may also take prioritized responses described previously and form condensed responses. The completeness of the information in the condensed response can be adjusted based on the channel availability. For example, condensing a response by removing less important information from the response or sending less important information at a later time when channel availability has improved will enhance overall operational efficiency. Hence, by adjusting verbosity of response, the AI server 104 of the embodiments provides for improved operational efficiency of communication system 100.

For additional efficient channel bandwidth management, the AI server 104 may further provide interrupt capability for responses containing higher priority content. Thus, if communication device 102 is in the midst of playing out information in response to a query pertaining to some general facet of information, the AI server can interrupt the response with a higher priority response.

Figure 1B:
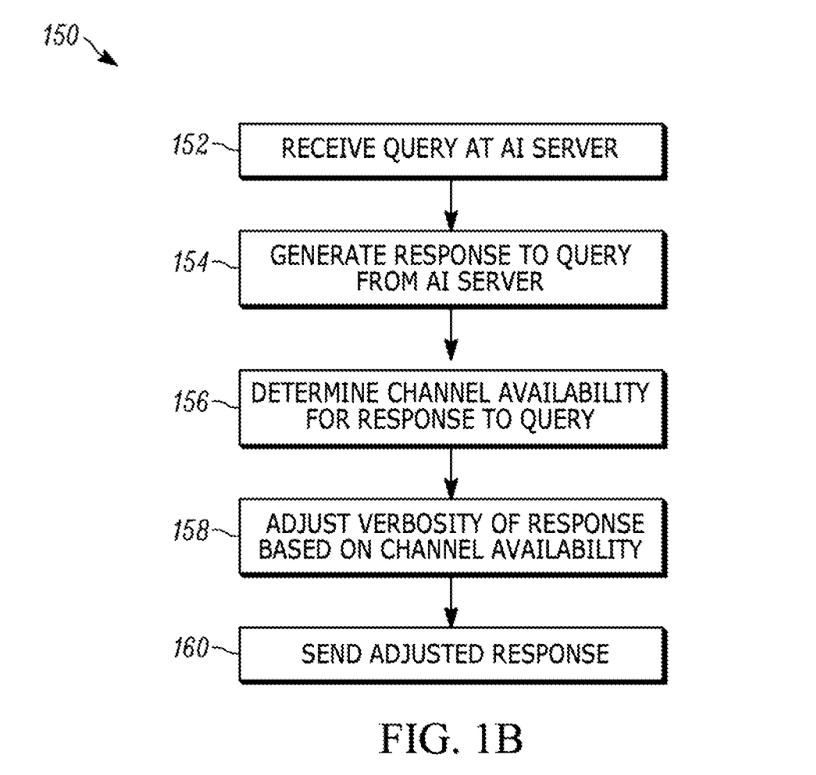
FIG. 1B is a flowchart for managing verbosity of response in accordance with some embodiments.

Referring to FIG. 1B, there is provided a method 150 of varying information for optimized use of channel availability in a communication system in accordance with the some of the embodiments. The method 150 begins at 152 by receiving a query at an artificial intelligence (AI) server, such as AI server 104, the AI server having natural language processing and response capability. The query to the AI server may be in the form of verbal queries or a combination of verbal with text query.

In accordance with the type of query sent, the AI server in this case generates a verbose response to the query at 154. Moving to 156, the AI server determines channel availability for the verbose response, and then adjusts verbosity of response at 158 based on channel availability, wherein channel availability is based on channel bandwidth and channel occupancy. The adjusted response to the query is sent at 160. Hence, the communication system 100 and method 150 provide an AI server that determines channel availability for a verbose response to a communication device and manages the verbosity of response across available channels within the communication system.

In accordance with these method embodiments, the adjusting verbosity of the response may be accomplished in several different ways, including but not limited to: summarizing content of the response to occupy the channel bandwidth, and/or condensing content of the response so as not to exceed available channel bandwidth. The adjusting verbosity of the response may also be accomplished by prioritizing content of the verbose response; and segmenting the prioritized content into shorter segmented responses, thereby freeing up the channel bandwidth between responses.

Responses can be interrupted based on priority. For example an adjusted response currently being played out at a device can be interrupted by another response, wherein that other response contains content having higher priority content.

Hence, the system 100 and method 150 of the embodiments provide for management of a verbose response with which to efficiently use available channel bandwidth.

Figure 2:
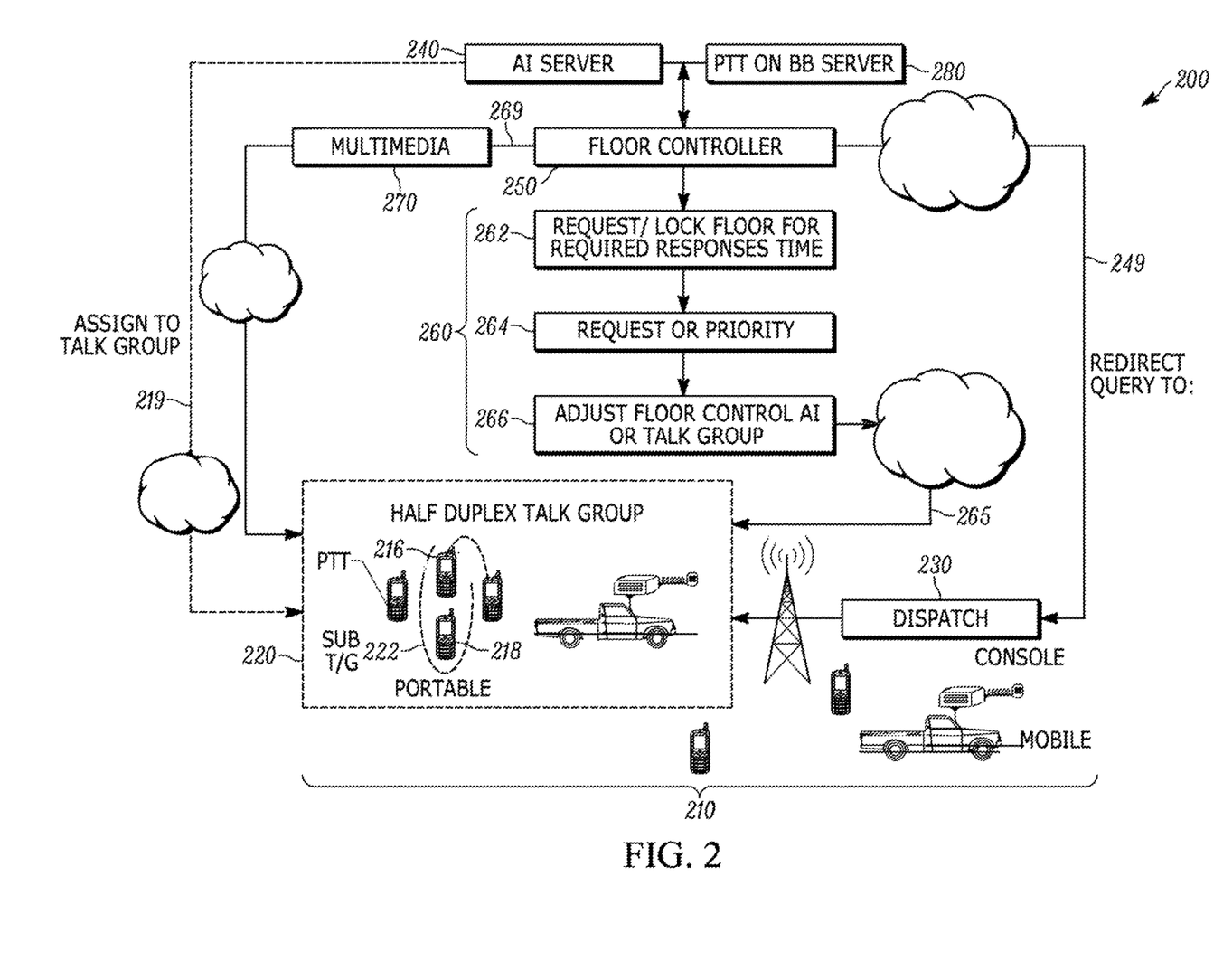
FIG. 2 is a communication system block diagram formed and operating in accordance with some embodiments.

FIG. 2 is a communication system 200 formed and operating in accordance with some embodiments. Communication system 200 comprises a plurality of communication devices 210, comprising a plurality of half-duplex radios which may be portable handheld operated radios or mobile vehicular radios. These half-duplex radios communicate (transmit mode) using a push-to-talk (PTT) button over a communications channel to one or more of the remaining radios which listen (receive mode) and are often referred to as two-way radios or PTT radios. The AI server 240 while still providing all of the ability to vary a verbose response as described by the previous embodiments, further provides additional advantages directed to half duplex communication systems.

The communication system 200 may be a broadband system having PTT capability, such as enabled via broadband-over-PTT server 280. The communication system also may be a narrowband system, such as a public safety communications system used by law enforcement, fire rescue, and the like, comprising the plurality of portable and mobile PTT radios 210. The plurality of radios 210 each comprise microprocessor, transceiver and appropriate, RF and controller circuitry for radio communication operations.

In accordance with the embodiments, the artificial intelligence (AI) server 240 is incorporated into the communication system 200 for responding to queries from one or more of the half-duplex radios 210 which have been formed into a talkgroup 220. The AI server, as previously described is implemented using, a natural language processing system and a spoken artificial query response system. Examples of such processing systems include but are not limited to Siri, OK Google, as well as others known or yet to be developed.

During regular radio operation the talkgroup 220 may be assigned when any user in the group wishes to converse with another user in the talkgroup. A vacant radio channel is found automatically by the system 200 and the conversation takes place on that channel. Each radio transceiver, still controlled by its' respective microprocessor, can join in the formation of the talkgroup. Thus, formation of the talkgroup 220 allows a grouping of radios from within the plurality of radios 210 to listen and respond to each other's communications on a separate dedicated channel without involving the remaining system of radios.

In accordance with the embodiments, the AI server 240 takes advantage of the talkgroup formation to respond to queries from members of the talkgroup 220. In accordance with the embodiments, the AI server intelligently interacts with a floor controller 250 to minimize disruption in communication, maximize channel usage, and prioritize responses amongst members of the talkgroup. The incorporation of artificial intelligence 240 into the communication system 200 advantageously allows the half-duplex radios 220 to be operated as input points to receive verbal queries from a member of the talkgroup, thereby converting the radio device operation into a virtual assistant.

The AI server 240 of the embodiments is able to respond to the query making efficient use of channel bandwidth. The application of AI server 240 is advantageously applicable to both narrowband and broadband communication systems having push-to-talk (PTT) capability.

In accordance with some embodiments, the AI server 240 intelligently interacts with a floor controller 250, which provides a plurality of operational controls to minimize disruption of communication, maximize channel usage, and prioritize responses amongst members of the talkgroup 220. For narrowband devices, such as land mobile radio (LMR) devices, the floor controller 250 may be entirely located within the AI server 240, and/or embodied as a standalone floor control server. For applications extending the system 200 to broadband devices having PTT capability, such as certain PTT capable 3/4G LTE and Wi-Fi type devices, the floor controller 250 may be adapted to further operate with and/or be integrated as part of a push-to-talk on broadband server 280. Servers and networks which support broadband PTT operation may include, but are not limited to, a WAVE™ 5000 server by Motorola Solutions, Inc.

In accordance with the following embodiments, system 200 provides the AI server 240 for time controlled query and response optimization and in further embodiments an additional query-to-query response feature which allows for supplemental information to be accessed.

Initially referring to the time controlled query and response optimization, in accordance some embodiments the AI server 240 intelligently interacts with the floor controller 250 to provide responses to queries sent out by one or more radios from the one or more talkgroups, and the timing of responses of at least one of the AI queries is prioritized based on context information of the communication system.

In accordance with the embodiments, the AI server 240 can be responsive to predetermined verbal inputs or commands indicative of an AI request by a talkgroup member to have the AI join the talkgroup. A query sent to the AI server 240 from a radio in talkgroup 220 can be optimized for timing and prioritization. For example, a first talkgroup radio 216 initiates and sends a verbal request to the floor controller 250 to add artificial intelligence (AI) 240 within the talkgroup 220. The AI server 240 joins the talkgroup 220 via 219. By adding the AI into the talkgroup 220, the AI 240 and floor controller 250 are able to interoperate with the radios of the talkgroup 220 to determine response times 262, determine a request or assign priority 264, adjust different floor controls 266, determine delays in delivery, delays based on confidence levels, and all other control functions related to timing and prioritization that can further enhance the management of the query response system.

In accordance with a further query embodiment, talkgroup assignment can also be modified into sub talkgroups based on the query sent from the originating radio. For example, in response to a radio 218 sending a query to which the response is only to be played to two designated radios, 216 and 218, the AI server 240 responds by assigning the response to sub-talkgroup (SUB-T/G) 222, so that the response is only heard by members 216, 218 of the sub-talkgroup 222.

Accordingly, the system 200 allows for specifying, to the AI server 240, by the radio sending the query, such as radio 216, a subgroup 222 of talkgroup members 216, 218 from talkgroup 220, to hear the response, and sending the response, by the AI server, to the subgroup 222 of talkgroup members.

The AI server 240 responds to other queries from members of the talkgroup 220 within the radio communication system 200. The AI server intelligently interacts with a floor controller 240 to minimize disruption in communication, maximize channel usage, and prioritize responses amongst members of the talkgroup. The incorporation of artificial intelligence into a public safety radio communication system advantageously provides half-duplex radios with additional verbal and/or text query and response while maintaining regular talkgroup operation. The application of AI is applicable to both narrowband and broadband communication systems having push-to-talk (PTT) capability.

Additionally, in a public safety environment, it is important that the AI server 240 provide useful information in response to user queries so as not to inhibit time-critical public safety services (e.g., responding to a distress call, responding to an emergency at a correct location, and the like). Therefore, in some embodiments it may be advantageous to have the AI server 240 alternatively be automatically assigned to every talkgroup upon formation of such Talkgroups within the communication system 200.

In some embodiments, the AI server 240 may insert itself into the talkgroup based on certain keyword triggers. This self-insertion request is particularly advantageous for announcements, events, and the like. For example, if a user of a portable device asks to another member of the talkgroup "When does Main Street close for the holiday parade?" if no response is provided within a certain amount of time by a member of the Talkgroup, then the AI server will self insert into the talkgroup and respond to the query. For example, "Main Street will close between 10 am and noon for the holiday parade." Additional information may even further advantageously be provided by the AI server 240, of which an individual user might not be aware, such as: "Detour provided at Second Street."

In accordance with further embodiments, if the AI server 240 is unable to determine a response to a search query after a predetermined time, the AI server can automatically remove itself from the talkgroup, and even redirect the query to another source, if available, such as the dispatcher 230, multi media 270 or another talkgroup member. The multimedia resource 270 may provide, for example, a streaming video response in response to a redirected query. The dispatcher 240 may be a narrowband dispatcher or a broadband dispatcher. This self-removal of the AI advantageously maintains efficiency of the system 200 by redirecting queries 249, 269 to other resources, freeing up the AI server to attend to other queries to which it can provide a response.

For embodiments in which the AI 240 redirects the query to another resource to obtain supplemental information, these queries may be redirected, for example, to dispatcher 230 in text format inquiring if the dispatcher has resources to answer the query. The decision to send the query to the dispatcher 230 may be based on contexts factors associated with that dispatcher and knowledge of the working environment of the various radio users of the plurality of radios 210, and assigned members working in talkgroups within the communication system 200. Floor control is automatically provided to dispatcher 230 upon confirmation that the dispatcher 230 does indeed have information with which to respond to the query. The dispatcher 230 then sends a verbal response over dispatch radio to the query radio of the talkgroup 220.

In other embodiments to obtain supplemental information, the AI 240 may verbally inquire to other radios of the talkgroup 220 as to whether they have information with which to respond to the query. If a radio member confirms such knowledge, then the AI server 240 can redirect the query to that radio member within the talkgroup 220 along with providing floor control to respond to the query. A response can then be played out from the initiating radio. Depending on the type of query sent, the response may be played out to all or some members of a talkgroup. If the query included a command or instruction to restrict the response to certain talkgroup members (radios 216, 218 of the sub-group 222), then the response can be limited to those members as previously described. Thus, although it may be important for a response to get to one or more members, and that the group be aware of that situation, it may not be necessary for the entire talkgroup to listen to the response. It can be sufficient for certain members to simply be made aware that a response did occur.

In another supplemental information embodiment, the redirected query may be a text query sent to the multimedia resource 270 which may, as a result of the query, generate a streaming video response for transmission back to the initiating query radio 216. The streaming video may be played out at all radios of sub-talkgroup 222, which in this example is formed of radios 216 and 218. If no sub-talkgroup was formed, and no other restrictions were placed, the streaming video can be played out through the radios members of talkgroup 220.

In another supplemental information embodiment, the redirected query may be a text query sent to the dispatcher 230 operating in broadband. The dispatcher 230 can generate a video streaming response for transmission back to the initiating query radio 216. Hence, a video streaming response to a verbal query that originally initiated at a half duplex radio 216 has been provided, by using the AI server's ability to redirect queries.

In accordance with further embodiments, the control of the timing and the control of the supplemental information are optimized through various floor control operations of communication system 200. Floor controller 250 of AI server 230 provides floor control operations based on a variety of floor control factors 260, of which only a few are shown. Floor control operations may be based on the length of an expected response. For example, the AI server 240 can request and/or lock the floor for a predetermined required time to complete a response 262.

Priority of an AI floor request can be dependent on a radio requestor priority. Some radio users, identified by radio user ID, and/or some types of verbal requests may have a higher priority and be responded to prior to others 264.

If a channel is heavily used, the AI server 240 can adjust content and/or depth of a response to fill available floor time 266. For example, a radio channel which is heavily used may have a response adjusted into a summary response so as not to impact channel usage.

In some embodiments, it may be desirable to have an order of response content prioritized and segmented into smaller responses, thereby freeing up channel availability between responses.

Priority (and thus capability to interrupt AI) of other talkgroup members can be adjusted based on the applicability of the content to them. For instance, if a member of the talkgroup is listening to a response and determines that the response is no longer relevant to the talkgroups current conditions or needs further detail, that higher priority user can interrupt the response by pressing PTT and verbalizing a new query. For example, if rookie police office sent a query asking for an entire map to be streamed 219 over multimedia 270 of the entire holiday parade route, then a senior office could interrupt that response with a query "does the holiday parade cross Main and Second Street?"

Accordingly, by incorporating floor control operations with artificial intelligence, communication systems, such as a public safety communication system, and half duplex radios operating within the system can now advantageously provide talkgroup operation with additional query search capability.

Figure 3:
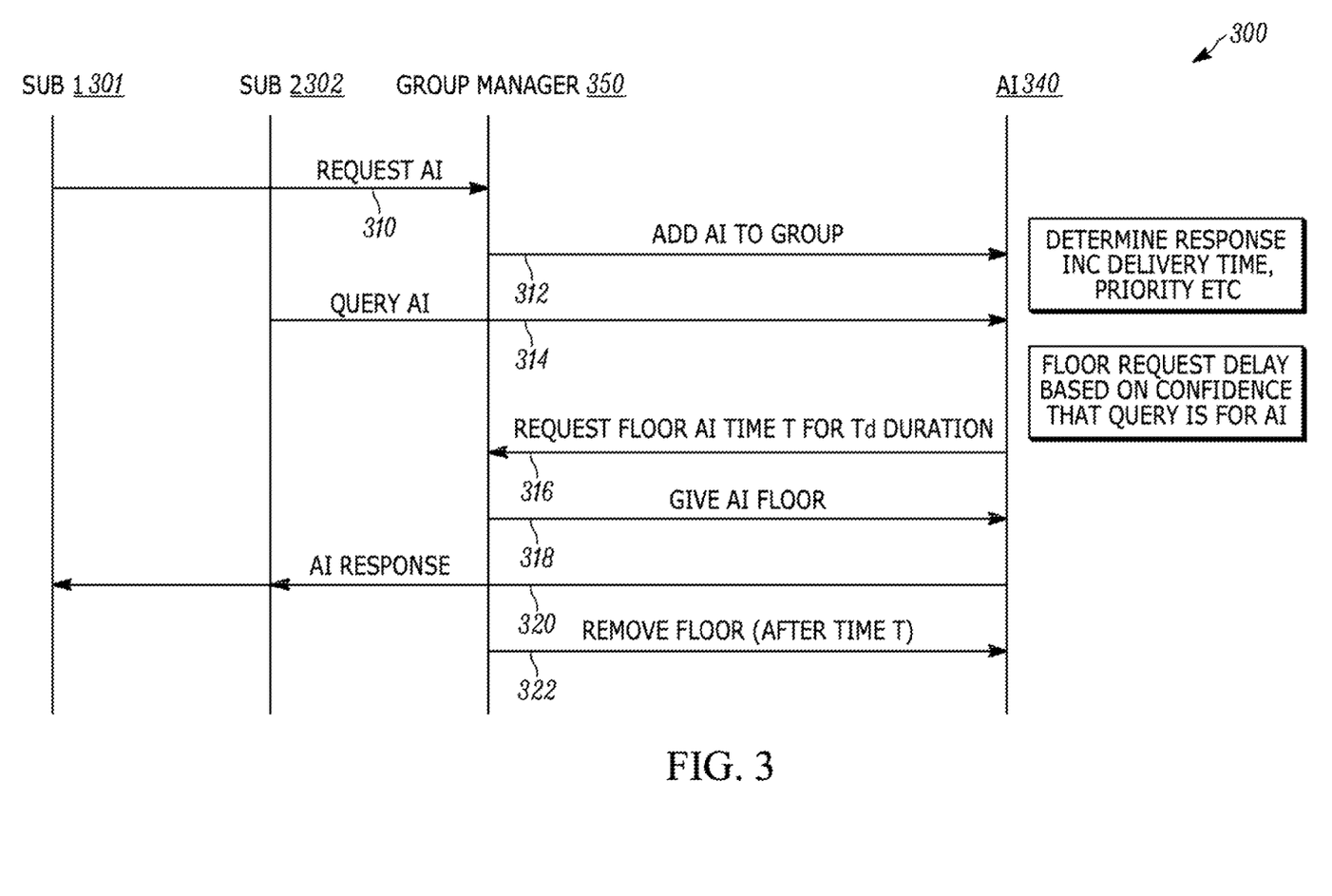
FIG. 3 is a communication exchange diagram in accordance with some embodiments.

FIG. 3 shows an example of a communication exchange diagram in which artificial intelligence is added as a member of the talkgroup in accordance with some of the embodiments. At 310, a first sub-talkgroup radio 301 sends a verbal request to add artificial intelligence (AI) within the talkgroup. This request is received by group manager 350 (equivalent to floor controller of FIG. 2) at 310. The request 310 triggers a response from the group manager 350 to add artificial intelligence 340 (AI) to the talkgroup at 312. By adding the artificial intelligence 340 into the group, the AI 340 and floor manager 350 are able to interoperate with the radios of the talkgroup to determine response times, an increase or decrease in delivery time, determine priority, assign priority, and all other control functions that can further enhance the management of the query response system.

A query is sent at 314 to the AI 340 from a second sub-talkgroup radio 304. A word analysis is performed by the AI 340 to determine a confidence level that the query is intended for the AI. Depending on the confidence level, a request for a delay is sent to the floor 350, as indicated at 316 where the AI 340 sends a request to the group manager 350 requesting floor time at a particular time, T, and for a predetermined duration time, Td. The group manager 350 then proceeds to grant the floor to the AI 340 at 318. The AI 340 has already completed the search and is ready to generate and send a response to radios 302 and 301 at 320, after which time the floor can be removed at 322.

The response from the AI is sent to the query radio 302, and automatically also sent to the initiator radio 301, unless otherwise specified by the requestor. These radios are all operating on the same sub-talkgroup channel, so unless there is an instruction to assign or direct the response to a different free channel, then all the radios within the talkgroup will hear the response.

Thus, the timeline 300 illustrates has demonstrated some of the timing factors that can be taken into consideration in accordance with the embodiments.

Figure 4:
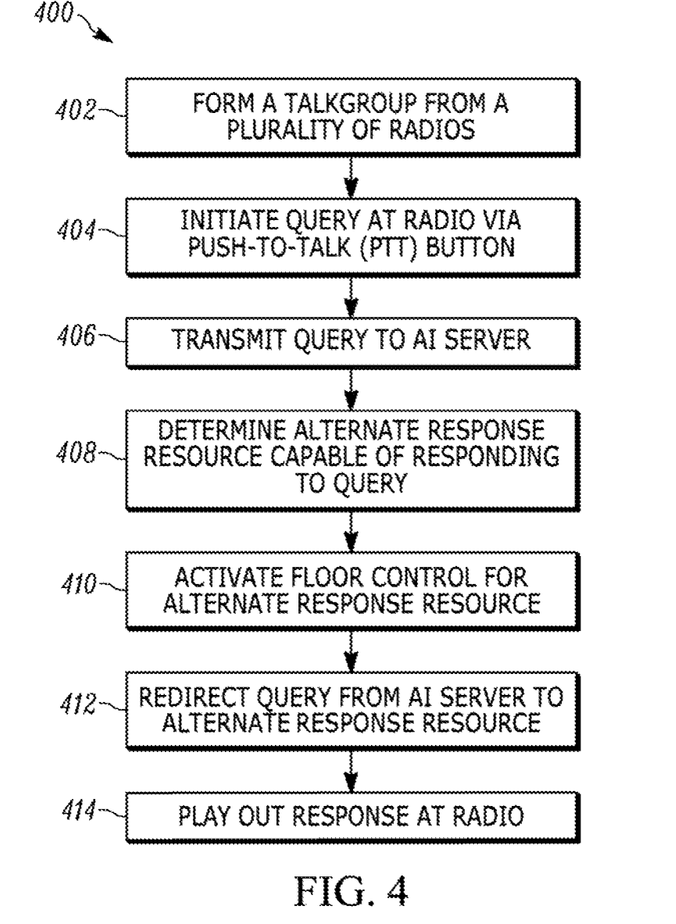
FIG. 4 is a flowchart for obtaining supplemental information in accordance with some embodiments.

Referring to FIG. 4, there is shown a method 400 in accordance with a query-to-query embodiment. The query-to-query embodiment allows for supplemental information to be acquired beyond that normally available from the AI server 240 of FIG. 2. Beginning at 402 a talkgroup is formed from a plurality of radios followed by initiating a query at one of the radios via the push-to-talk (PTT) button at 404.

The method can further comprise triggering the AI server via an input of the radio prior to initiating the query, thereby allowing the AI server to join the talkgroup. The input to the radio (the trigger) can be for example, a PTT verbal pre-command, and/or a non-PTT out of band text message, depending on the type of system. The search query can follow the pre-command. For example, the pre-command may be the spoken word "Einstein", followed by the search query "How many registered firearms are located at this location?"

The method 400 proceeds by transmitting the search query at 406 to the AI artificial intelligence server, the AI server being the AI server 240 of FIG. 2 having natural language processing and response capability as previously described.

At 408, in accordance with the query-to-query embodiment, in response to receiving the query, the AI server determines that an alternate response resource is capable of responding to the query or providing a better response. The AI server 240 then requests that the floor controller 250 give the talkgroup floor to the alternate response resource at 410, such as dispatcher 230 or another radio of the talkgroup of FIG. 2. The verbal query is redirected from the AI server 240 via the floor controller to alternate resource at 412. In some embodiments it may be useful for the AI server to convert the verbal query to a text query prior to redirecting the query to the alternate resource. For example, verbal queries converted to text format can be redirected to the dispatcher 230 from the AI server 240. Text format is preferred so as not to disrupt dispatch radio audio communications which may be on-going with other users. An advantage of redirecting a query request to a dispatcher 230 is that this dispatch resource can research the text version of the query and return, via dispatch transmit, a verbal researched response to the initiating query radio. The response is thus provided straight from the dispatcher 230 to the initiating query radio 216 without having to go back through the AI server 240, further enhancing efficiency of operation.

If the AI server does not know the answer to a query or determines that an alternate source would have a better response, the AI server can also redirect the query to that source. For example another member of the talkgroup or a multimedia source 270.

The floor controller 250 automatically provides the floor to the alternative resource when the AI server 240 seeks additional information to the query or redirects the query. Utilizing alternate resources further provides improved use of channel bandwidth and efficiency in managing the query response portion of the communication system.

Figure 5:
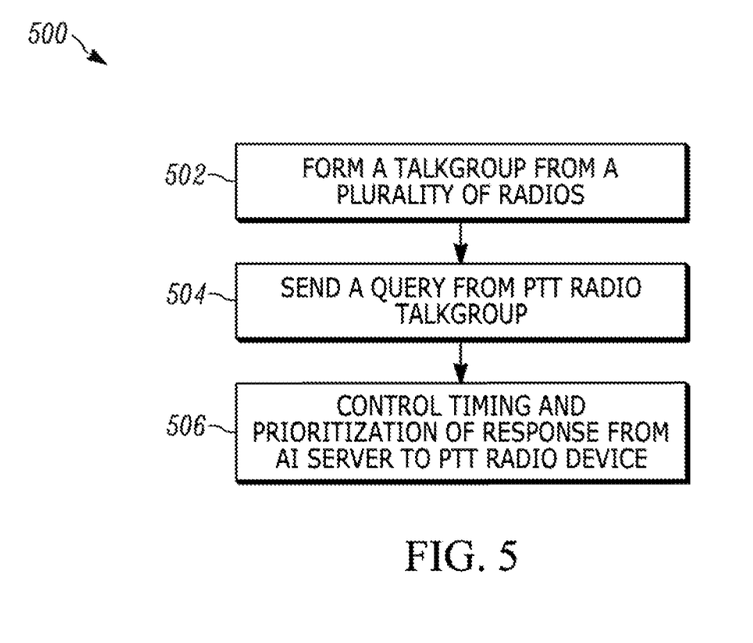
FIG. 5 is a flowchart for a timing method in accordance with some embodiments.

Moving to FIG. 5, a method 500 is shown which summarizes the timing embodiments that have been described in FIG. 2. Method 500 begins with the formation of a talkgroup at 502, followed by sending a query from a PTT radio device at 504. In some embodiments, AI server may automatically insert and later remove itself from the talkgroup upon sending the response. In some embodiments, the AI server 240 and a floor controller 250 may automatically be assigned upon formation of one or more talkgroups within a communication system. In yet still other embodiments, a radio member of the talkgroup sends an AI request, as was described in FIG. 3, for the AI server to join the talkgroup.

In accordance with some embodiments, controlling timing and prioritization of the response sent to the PTT device by the AI server will greatly improve the overall management of the query response system. For example, the AI server 240 of FIG. 2 waiting to generate and send the response, until after a predetermined response wait time has expired, provides members of the talkgroup the opportunity to provide relevant information and make other members aware of it. Using the expiration wait time provides the assurance that a response to the query, from the AI server, can still be received when no member of the talkgroup is able to respond. The wait time can be determined based on analyzing the query to provide a confidence level that the query was intended for the AI 240, radio channel bandwidth and the AI server's floor control availability, or any combination of, thereby providing efficient control of channel usage. Analyzing the query to determine the confidence level may include name searching. For example, if the AI is named Einstein, and the query includes the name "Einstein" the confidence will be very high that this is a query directed to the AI 240. When the confidence is high, the AI 240 can respond immediately and hence have a zero wait time. However, if the query starts with the name of another user in the talkgroup, it is likely that the query was not directed to the AI server. In this case, the AI waits the maximum wait time before responding. If during the wait time, the AI determines that the requestee has responded, then the AI 240 will not respond unless it has additional information that would be useful.

The method 500 can be further enhanced if desired by applying priority. For example, by determining a priority for sending a response from the AI server 240, and sending the response based on the priority. Prioritizing of a radio query, and its' subsequent response, may be based on context factors, such as radio user identity, rank of requestor, rank of other members of the talkgroup, number of members in the talkgroup. For example, a Fire Chief, a Police Officer, a Detective, to name a few. Prioritizing of the radio query may also be based on context factors associated with an incident scene of the query radio, such as incident scene type and public safety information pertaining to the incident scene. For example, traffic accident, airplane explosion, train derailment, robbery, home invasion, are just a few examples. The prioritizing of the radio query may be based on verbal query words having predetermined keyword priority rankings, such as "FIRE", "TOXIC", "EMERGENCY", "POISON" and "EXPLOSION" and the like.

In accordance with some embodiments method 500 may further adjust a response wait time, by the AI server based on a confidence level that the verbal query was intended for the AI server or for members of the talkgroup.

In accordance with some embodiments method 500 may further determine an anticipated response time. Depending on the type of priority, it may further be desired to lock the floor control for the anticipated response time. For example, in mission critical events, such as fire rescue, the generation and transmission of a high priority response is critical when other members of a talkgroup have not been able to answer a query and the confidence level is fairly high that the intended recipient of the query is now the AI server 240.

Method 500 can be further enhanced by re-prioritizing automated verbal responses to the query, from the AI server 240, in response to changes in incident scene context determined by the AI server, wherein the incident scene context is monitored as part of the query.

The following Table provides a few examples Confidence levels, Channel Occupancy, AI priority, wait time, and response time needed.

| Req. Type | Query | Conf. Level that Query is for AI (H/M/L) | CH AVL (H/M/L) | AI Priority (H/M/L) | Wait Time | Required Response Length Time (seconds) | Effect Timeline/Verbosity/ Query-to-Query Information |
|---|---|---|---|---|---|---|---|
| Fire Chief | Einstein, What flammable materials are in this building? | H | L | H | 0 | 30 | Timeline<br>AI requests CH. availability for 30 seconds with high priority to send response "Chemicals, x, y, z" |
| Police Officer | Who are members ABC Gang? | M | L | M | 10 | 10 | Timeline<br>AI waits 10 seconds to see if anyone responds, if not, then requests floor for 5 seconds to send response "member names Lee, Barb" |
| Detective | What plate numbers on | L | L | M | 10 | 10 | Query-Query info. & Timeline |

| Req. Type | Query | Conf. Level that Query is for AI (H/M/L) | CH AVL (H/M/L) | AI Priority (H/M/L) | Wait Time | Required Response Length Time (seconds) | Effect Timeline/Verbosity/ Query-to-Query Information |
|---|---|---|---|---|---|---|---|
| | red corvette? | | | | | | AI does not have answer, but determines that Officer Smith should know answer, AI waits for officer to answer, if no response then requests floor. "Officer Smith, please provide license plate #s from your position." AI transfers floor control to Officer Smith |

The Table is meant to provide non-limiting, examples of just a few scenarios in which the various embodiments be applied.

Accordingly, there has been provided a communication system incorporating artificial intelligence and methods for controlling an AI server within the system. A method for varying verbosity of response, a method for determining timing of a response, and a method for obtaining supplemental information for a response have all been provided. The system and methods have provided for optimized usage of channel bandwidth, improved timing, and redirection of query/response for more accurate information acquisition. Improved management of virtual assistant search queries and responses can now be obtained using an artificial intelligence (AI) server managed in accordance with the described methods provided by the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method of varying information in a communication system, comprising:
  receiving a query at an artificial intelligence (AI) server, the AI server having natural language processing and response capability;
  generating, at the AI server, a verbose response to the query;
  determining, at the AI server, channel availability for a response to the query; and
  adjusting, at the AI server, content of the response by varying the verbosity of the response based on the channel availability, wherein channel availability is based on channel bandwidth and channel occupancy, wherein varying the verbosity of the response includes substituting, at the AI server, a word included in the response with an alternative shorter word, an acronym for the word, or a predetermined codename for the word.

2. The method of claim 1 further comprising:
  sending the adjusted content of the response to the query.

3. The method of claim 1, wherein adjusting content of the response by varying the verbosity of the response further comprises:
  summarizing content of the response to occupy the channel bandwidth.

4. The method of claim 1, wherein adjusting content of the response by varying the verbosity of the response further comprises:
  condensing content of the response so as not to exceed available channel bandwidth.

5. The method of claim 1, wherein adjusting content of the response by varying the verbosity of the response further comprises:
  prioritizing content of the verbose response; and
  segmenting the prioritized content into shorter segmented responses, thereby freeing up the channel bandwidth between responses.

6. The method of claim 2, wherein sending the adjusted content of the response to the query further comprises:
  interrupting the adjusted response when the content of another response has higher priority content; and
  sending the higher priority content response.

7. The method of claim 1, wherein the AI server operates in a narrowband network.

8. The method of claim 1, wherein the AI server operates in a broadband network.

9. The method of claim 1, wherein the query is sent from a (push-to-talk) PTT radio of a talkgroup to the AI server.

10. The method of claim 1, wherein the query is sent from a PTT narrowband communication device.

11. The method of claim 1, wherein the query is verbal query.

12. The method of claim 1, wherein the query is a combination of verbal and text query.

13. A communication system, comprising:
  a plurality of communication devices;
  an artificial intelligence (AI) server receiving a query from one of the plurality of communication devices, the AI server having natural language processing and response capability;
  the AI server generating a verbose response to the query;
  the AI server determining channel availability for a response to the query; and
  the AI server adjusting content of the response by varying verbosity of the response based on the channel availability, wherein channel availability is based on channel bandwidth and channel occupancy, wherein the AI server varies the verbosity of the response by substituting a word included in the response with an alternative shorter word, an acronym for the word, or a predetermined codename for the word.

14. The communication system of claim 13, wherein the AI server prioritizes content within the verbose response and varies the verbosity of the response by segmenting the prioritized content into shorter prioritized responses.

15. The communication system of claim 14, wherein the AI server provides interrupt capability for responses containing higher priority content.

16. The communication system of claim 14, wherein the prioritized responses comprise condensed responses.

17. The communication system of claim 13, wherein content of the verbose response is adjusted so as not to exceed available channel bandwidth.

18. A communication system, comprising:
  a communication device operating within the communication system;
  an artificial intelligence (AI) server having natural language processing and response capability, the AI server controlling query and response activity between the AI server and the communication device, the AI server providing prioritization of responses between the AI server and the communication device based on verbosity of the response and channel availability within the communication system, wherein the AI server varies the verbosity of the response based on the channel availability by substituting a word included in the response with an alternative shorter word, an acronym for the word, or a predetermined codename for the word.

19. The communication system of claim 18, where prioritization based on the verbosity of the response comprises at least one of:
  response content length; and
  response content complexity.

20. The communication system of claim 19, wherein prioritized content is segmented in accordance with priority into shorter segmented responses.

21. The method of claim 1, wherein varying the verbosity of the response based on the channel availability comprises:
  joining, by the AI server, a talk group;
  determining, at the AI server, an available floor time corresponding to a talk group channel granted by a floor controller to the AI server for responding to the query on the talk group;
  adjusting, at the AI server, the content of the verbose response to fill the available floor time; and sending, by the AI server, the adjusted content of the verbose response over the talk group channel.

\* \* \* \* \*